US006351539B1

(12) United States Patent
Djakovic (10) Patent No.: US 6,351,539 B1
(45) Date of Patent: Feb. 26, 2002

(54) CIPHER MIXER WITH RANDOM NUMBER GENERATOR

(75) Inventor: Vladan Djakovic, San Jose, CA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 0 days.

(21) Appl. No.: 09/156,774

(22) Filed: Sep. 18, 1998

(51) Int. Cl.$^7$ ................................................ H04L 9/08
(52) U.S. Cl. ............................ 380/268; 380/44; 380/46
(58) Field of Search ............................. 380/268, 44, 46

(56) References Cited

U.S. PATENT DOCUMENTS

| | | | | |
|---|---|---|---|---|
| 4,933,969 A | * | 6/1990 | Marshall et al. | 380/125 |
| 4,995,082 A | * | 2/1991 | Schnorr | 380/23 |
| 5,214,703 A | | 5/1993 | Massey et al. | 380/37 |
| 5,384,848 A | * | 1/1995 | Kikuchi | 380/48 |
| 5,606,616 A | | 2/1997 | Sprunk et al. | 380/29 |
| 5,623,549 A | | 4/1997 | Ritter | 380/37 |
| 5,671,284 A | | 9/1997 | Buer | 380/29 |
| 5,673,319 A | | 9/1997 | Bellare et al. | 380/25 |
| 5,703,952 A | * | 12/1997 | Taylor | 380/44 |

OTHER PUBLICATIONS

Menezes, Alfred f. et al., "Applied Cryptography", CRC Press LLC, Jan. 1997.*
"Randomness Recommendations for Security," Network Working Group, Request for Comments: 1750, Dec., 1994.
Bruce Schneier, Applied Cryptography, 2n Ed., John wiley & Sons, Inc. 1996, pp. 319–325, 336–339, 357–368.

* cited by examiner

Primary Examiner—Thomas R. Peeso
Assistant Examiner—Todd Jack
(74) Attorney, Agent, or Firm—Pillsbury Winthrop LLP (57) ABSTRACT

An encryption device has a random number generator whose output is combined by exclusive-or with plaintext input which has been encrypted by a first block cipher. The combined exclusive-or output is encrypted with a second block cipher mechanism which produces a second enciphered output. The output of the random number generator is also encrypted by a third block cipher mechanism which produces a third enciphered output. The first and second block cipher mechanisms differ from each other.

29 Claims, 7 Drawing Sheets

CIPHER MIXER WITH RANDOM NUMBER GENERATOR

BACKGROUND OF THE INVENTION

1. Field of the Invention

This invention relates to block ciphers. More particularly, this invention relates to improving the security of block ciphers using cipher concatenation in combination with a random number generator.

2. Description of the Related Art

Various block ciphers are known and are used to encrypt (and decrypt) data. Block ciphers are described in detail in Bruce Schneier, "Applied Cryptography" Second Edition, 1996, which is incorporated herein by reference. Block ciphers operate on blocks of plaintext and ciphertext, usually of 64 bits but sometimes longer. Block ciphers have the property that, using the same key, the same plaintext block will always encrypt to the same ciphertext block. Typical block ciphers currently use 128-bit keys although shorter and longer keys can be used.

It is generally the case that the greater the key length for a particular cipher, the stronger the cipher. In some ways this is simply related to the number of keys which need to be tried in order to decipher a message. A key length of k means that at most $2^k$ possible keys exist and must be tried in order to decipher a message using an exhaustive key search. In fact, for an n-bit block cipher with a k-bit key, given a small number e.g., $[(k+4)/n]$ of plaintext-ciphertext pairs encrypted under the key K, K can be recovered by exhaustive key search in an expected time on the order of $2^{k-1}$ operations.

Cipher concatenation or combined (e.g., chained) block ciphers are also known, however such combinations do not necessarily add to security since they may not effectively increase the key length. For example, double encryption with two separate 128-bit keys does not provide effective 256-bit key security against known attacks.

One of the reasons that cascaded or multiple chained block ciphers may not be any stronger than a single block cipher is that chains are vulnerable to various attacks which do not require brute force attempts using all keys. A naïve exhaustive attack on all key pairs in double DES uses on the order of $2^{112}$ operations, whereas a non-naïve, so-called meet-in-the-middle attack on the same combination requires only on the order of $2^{56}$ operations. Various other combinations are known, including, e.g., triple encryption with two keys, and other variants on triple encryption.

One other known way to combine multiple blocks is to use two algorithms (and two independent keys). Using this approach, first generate a random-bit string, R, the same size as the message M. Then encrypt R with the first algorithm (and the first key) and then encrypt M⊕R (the exclusive-or combination of M and R) with the second algorithm (and the second key). The ciphertext is the combined result of the two encryptions and is at least as strong as the stronger of the two encryption algorithms.

Assuming that the random string is indeed random, this approach encrypts M with a one-time pad and then encrypts both the pad and the encrypted message with each of the two algorithms, respectively. Since both algorithms are required to reconstruct M, a cryptanalyst must break both. This method can be extended to multiple algorithms.

Combining multiple ciphers can have a problem in that the combination is potentially weakened if one of the component ciphers is compromised. Further, the combination may be only as strong as only one of the elements in the combination.

It is desirable to produce block ciphers with arbitrarily long key length so as to increase their security. It is also desirable to produce such block ciphers from existing, already accepted block ciphers as components. By using existing block ciphers as components, there is already a built up trust in the components.

SUMMARY OF THE INVENTION

This invention solves these and other problems by providing a combination block cipher with an effective key length greater than that of its components.

This invention increases the security provided by any single block cipher by providing encryption of an input stream by at least two different block ciphers. To add to the security, a one-time pad in the form of a random data stream, is combined with an encrypted form of the input stream before it is encrypted by the second block cipher.

In one aspect, this invention is an encryption device which has a random number generator and three block cipher mechanisms. The first block cipher mechanism takes a plaintext input and produces a first enciphered output based on the plaintext and on a first key. An exclusive-or mechanism takes as input the first enciphered output from the first block cipher and the output of the random number generator and produces a combined output. The second block cipher mechanism takes as input the output of the exclusive-or mechanism and produces a second enciphered output based on the output of the exclusive-or mechanism and on a second key. The third block cipher mechanism takes as input the output of the random number generator and produces a third enciphered output based on the output of the random number generator and on a third key. The first and second block cipher mechanisms differ from each other, with one preferably being the IDEA block cipher, and the other preferably being the Blowfish block cipher.

Preferably the first and third block cipher mechanisms are Blowfish block ciphers and the second block cipher is the IDEA block cipher. The plaintext input is preferably a sequence of 64-bit values and the output of the random number generator is a sequence of 64-bit random values. Preferably the random number generator is a true random number generator.

In another aspect, this invention is the decryption device corresponding to the encryption device.

This invention's combination of block ciphers with random numbers has a number of advantages, including:

Cryptanalysis based on known characteristics of the plaintext is impossible.

The effective key length is the sum of key lengths used in BC1 and BC2 (256-bits in the preferred scheme).

Failure (such as discovery of a backdoor) of any of the two block cipher kinds used still leaves the 128-bit security of the other intact.

The same plaintext block never encrypts to the identical ciphertext block, and yet every ciphertext block is independent from any other ciphertext block.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION OF THE PRESENTLY PREFERRED EXEMPLARY EMBODIMENTS

Description

Figure 1:
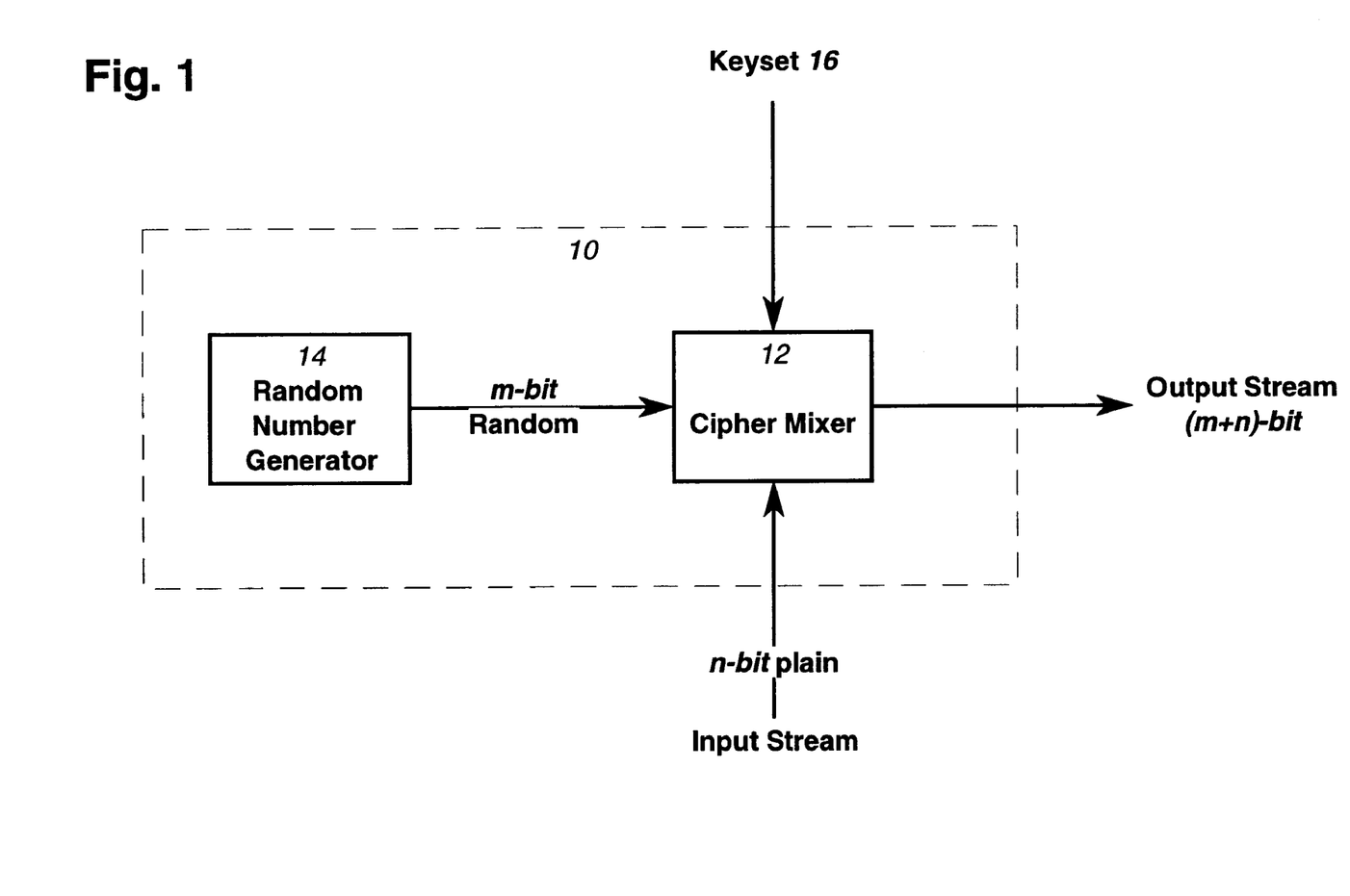
FIG. 1 depicts a general overview of a cipher mixer according to this invention.

With reference to FIG. 1, a general cipher mechanism 10 according to this invention has a cipher mixer 12 an random number generator (RNG) 14. The RNG 14 produces as its output a sequence of m-bit random numbers which are input to the cipher mixer 12 along with n n-bit input stream of plaintext. Using keys derived from an input keyset 16, the cipher mixer 12 produces an (m+n) bit output stream. Preferably the RNG 14 is a true random number generator.

Figure 2:
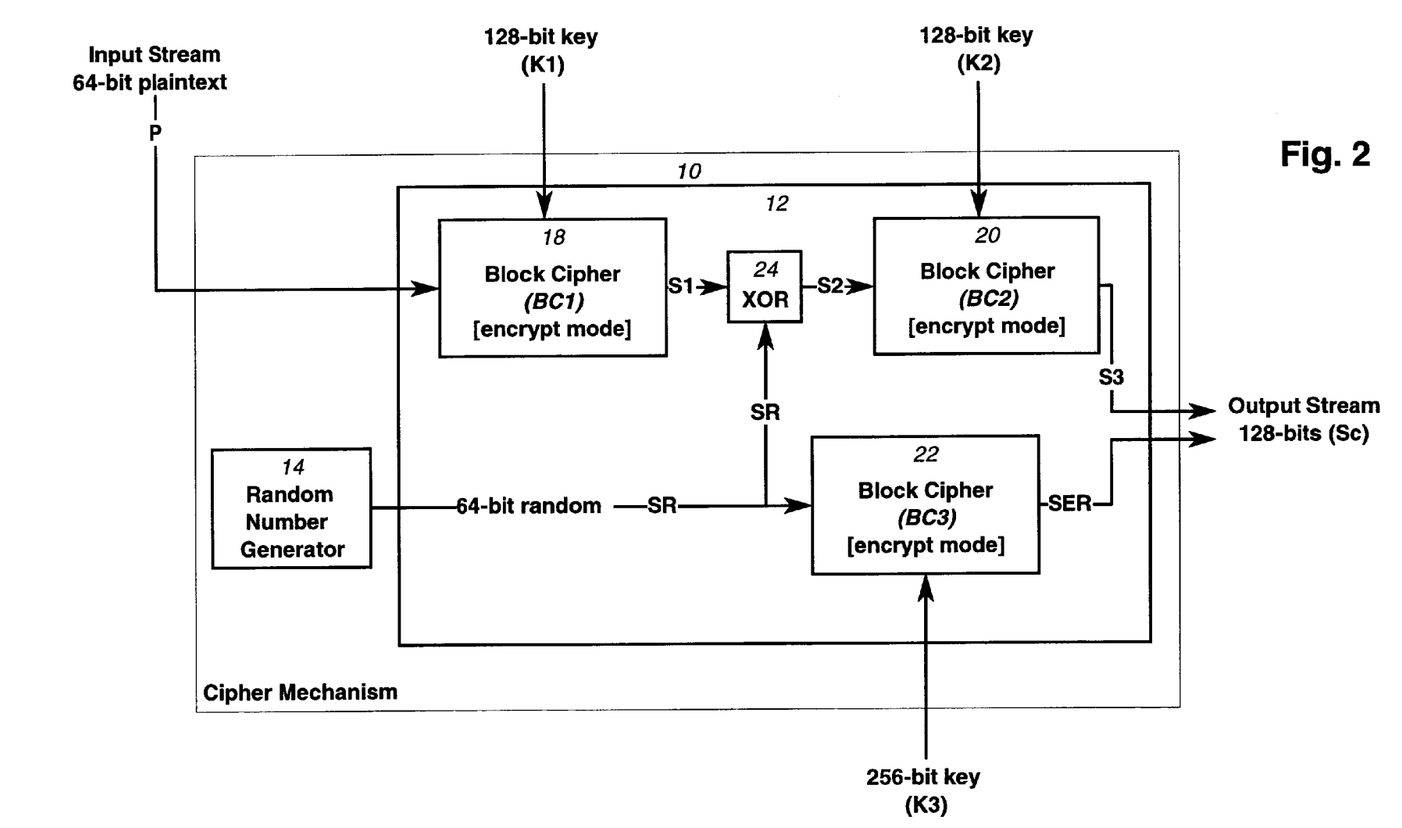
FIG. 2 depicts an embodiment of the cipher mixer of FIG. 1.

FIG. 2 depicts, in greater detail, an embodiment of the cipher mixer cipher mechanism 10 shown in FIG. 1. In this embodiment, the RNG 14 produces a sequence of 64-bit random numbers (denoted SR) and the input stream of plaintext is a sequence of 64-bit values (denoted SR) and the input stream of three keys: key 1 (denoted K1), a 128-bit key; key 2 (denoted K2), another 128-bit key; and key 3, (denoted K3), a 256-bit key. In some other embodiments, K3 is a 128-bit key.

The cipher mechanism 10 also includes three block ciphers 18, 20, 22 (denoted BC1, BC2 and BC3, respectively), and a exclusive-or (XOR) mechanism 24. Preferably block ciphers BC1 18 and BC2 20 are different ciphers. Block cipher BC3 22 can be the same as BC1 18 (but preferably should not be the same as BC2) or it can differ from both of them. In preferred embodiments of this invention, block ciphers BC1 and BC3 are the Blowfish cipher (described below), and block cipher BC2 is the IDEA cipher (described below). Any other block ciphers can be substituted for these two preferred ciphers. In particular, if either or both of these ciphers is compromised, it should be replaced with a cipher that has not been broken or that is known to be harder to break.

The IDEA block cipher is describedn in U.S. Pat. No. 5,214,703 to Massey, et. al., issued May 25, 1993 entitled "Device for the conversion of a digital block and use of same," incorporated herein by reference. IDEA uses a 128-bit key.

The Blowfish block cipher is a public-domain cipher developed by Schneier and described in "Applied Cryptography" pp. 336–339. Schneier also provides the program for Blowfish as C source code in "Applied Cryptography." Blowfish is a 64-bit block cipher with a variable-length key which can range from 40 to 448 bits in length.

Even though block ciphers may use the same key for encryption and decryption, they generally have different encrypting and decrypting modes. The various block ciphers used herein are in their respective encrypting modes when encrypting and in their respective decrypting modes when decrypting.

In operation, a plaintext input stream P is input to block cipher BC1 18 which operates on it (in encrypting mode) using the 128-bit key K1 to produce a sequence of 64-bit enciphered output values (denoted S1). That is, S1=BC1(P, K1). The sequence of random numbers SR produced by the RNG 14 are combined with the enciphered output values S1 using XOR mechanism 24 to produce a second sequence of output values, denoted S2. That is, S2=S1⊕SR. The second sequence S2 produced by the XOR mechanism 24 is input to the block cipher BC2 20 which operates on it (in encrypting mode) using the 128-bit key K2 to produce a sequence of 64-bit output values (denoted S3). That is, S3=BC2(S2, K2).

The sequence SR of random numbers produced by the RNG 14 is also input to block cipher BC3 22 which uses the 256-bit key K3 (in encrypting mode) to produce an enciphered random sequence of 64-bit values (denoted SER= BC3(SR, K3)). The 128-bit ciphertext output (denoted Sc of the cipher mechanism 10 is formed by combining the 64-bit sequence of values SER with the 64-bit values of S3.

The output sequence can be denoted as follows:

$$Sc=BC3(SR, K3)+BC2(SR \oplus BC1(P,K1), K2)$$

Figure 3:
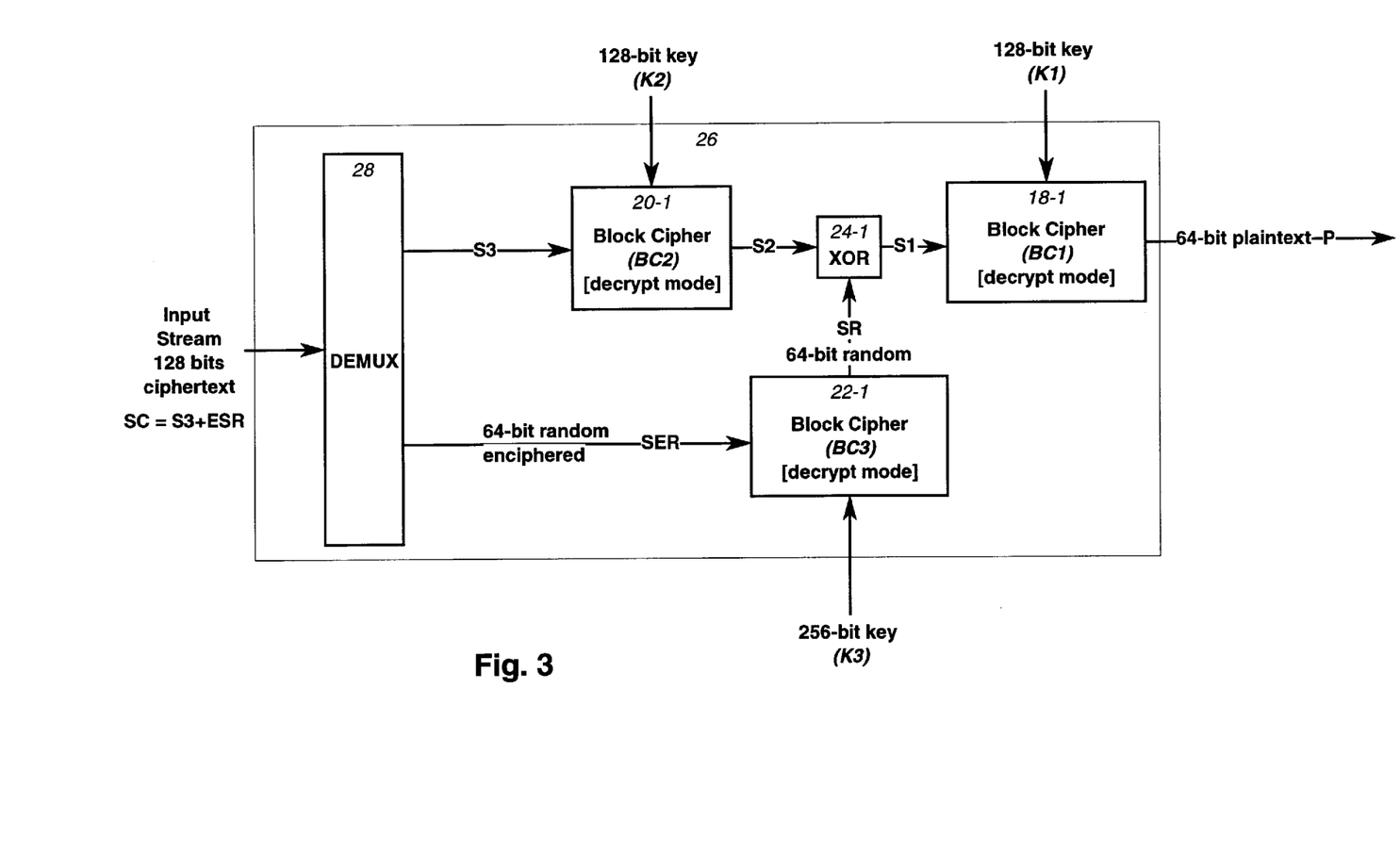
FIG. 3 shows an decryptor mechanism for the cipher mixer of FIG. 2.

FIG. 3 shows a decryptor mechanism 26 corresponding to the cipher mixer 10 of FIG. 2. The decryptor mechanism 26 takes as input a sequence of 128-bit values of ciphertext (Sc produced by cipher mixer 10) and produces the corresponding 64-bit plaintext (P). The decryptor mechanism 26 includes a de-multiplexer (DEMUX) 28 which takes the enciphered input stream (Sc) and splits it into two sequences of 64-bit values corresponding to sequences S3 and SER in FIG. 2. That is, the DEMUX 28 extracts the enciphered random sequence SER from the input Sc to the decryptor mechanism 26. The extracted sequence SER is deciphered using block cipher BC3 22-1 (in its decrypting mode) and the 256-bit key K3 to produce the random sequence SR. That is SR=BC3(SER, K3). The extracted sequence S3 is deciphered using block cipher BC2 20-1 (in its decrypting mode) using 128-bit key K2 to produce the sequence S2 which is then XORed (by XOR mechanism 24-1) with sequence SR to produce the sequence S1. That is, S1=SR⊕BC2(S3, K2). Sequence S1 is deciphered using block cipher BC1 18-1 (in its decrypting mode), using 128-bit key K1, to produce the 64-bit plaintext. That is, the plaintext is produced by BC1 (S1, K1).

The output of the decryptor mechanism 26 can be denoted:

$$P=BC1(BC3(SER, K3) \oplus BC2(S3, K2), K1)$$

where the input stream to the decryptor mechanism 26 is a combination of the two sequences SER and S3, and where SER and S3 can be extracted from the input stream.

The block ciphers used in the decryptor must match those used in the encryptor. Thus, to match the preferred encryptor of FIG. 2, block cipher BC2 20-1 is an IDEA block cipher, and block ciphers BC1 18-1 and BC3 22-1 are Blowfish block ciphers.

Combinations of Cipher Mixers

Cipher mixers according to the present invention can be used in combination. Examples of these combinations are shown in FIGS. 4 and 5.

Serial Mixers

Figure 4:
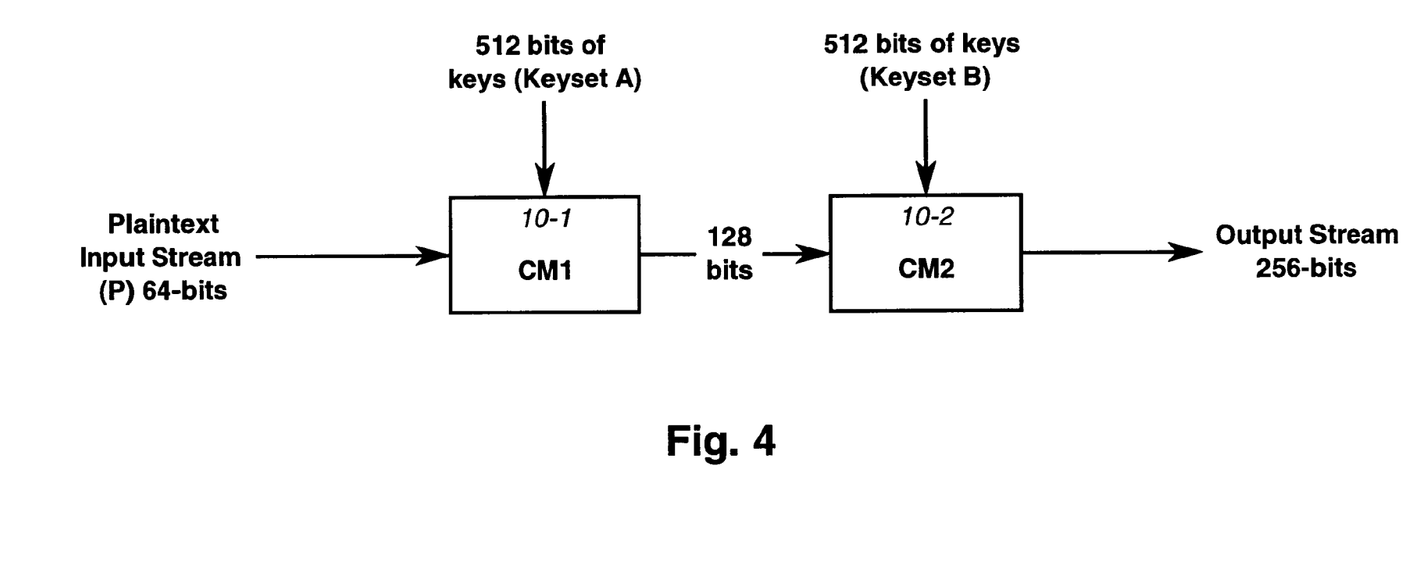
FIGS. 4 and 5 depict the use of combinations of cipher mixers according to this invention.
Figure 5:
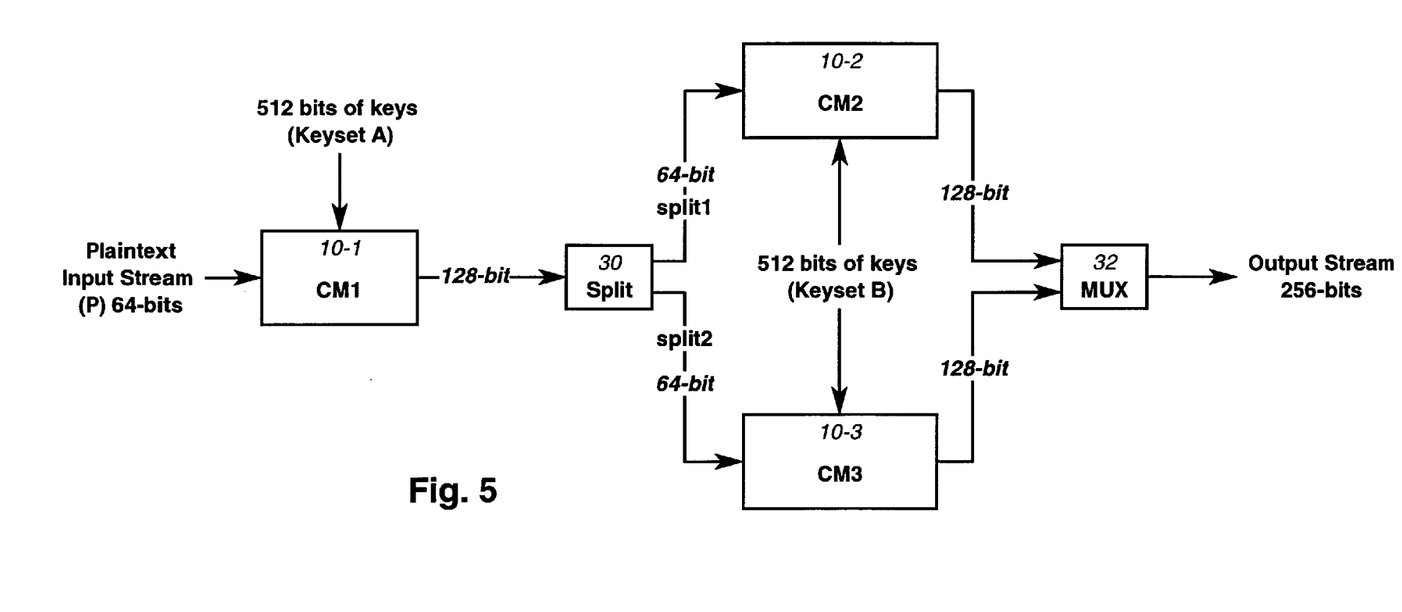

In FIG. 4, two cipher mixers CM1 and CM2, denoted 10-1 and 10-2, respectively, are connected in series. The plaintext P is input into CM1 which produces a 128-bit output using 512 bits of keys (denoted keyset A). The output of CM1 is input to CM2 which produces a 256-bit output sequence using 512 bits of keys (denoted keyset B). The output of CM2 can be denoted:

CM2(CM1(P, keyset A), keyset B).

In the embodiment shown in FIG. 4, the first cipher mixer CM1 operates a half the speed of the second cipher mixer CM2 so that the CM2 can process the doubled output.

Split Mixers

FIG. 5 shows three cipher mixers, CM1, CM2 and CM3. The plaintext P is input to CM1 which, using 512 bits of keys (denoted keyset A), produces a 128-bit output sequence which is split (by splitter 30) into two 64-bit sequences (denoted split1 and split2). One of these two sequences (split1) is input to CM2 and the other (split2) is input to CM3. Each of CM2 and CM3 operates on its respective input, using 512 bits of keys (denoted keyset B), to produce a 128-bit output sequence. The two 128-bit output sequences are combined by multiplexer 32 to produce a 256-bit output sequence.

The output of the combination of cipher mixers shown in FIG. 5 can be denoted:

MUX( CM2(Split1(CM1, keyset A), keyset B),
CM3(Split2(CM1, keyset A), keyset B)), where Split1 and Split2 denote the two 64-bit outputs of splitter 30.

In this embodiment, all mixers can operate at the same speed.

Random Number Generation

It is preferred that the random number generator 14 used in this invention be a true random number generator. In this manner it produces essentially a one-time pad which is combined with the plaintext. The choice of random number generator depends on the degree of security required. A true random number generator is most preferred.

The disadvantages of purely algorithmic methods to produce sequences of supposedly random numbers are well known. It is well known that most purely algorithmic methods to random number generation produce so-called pseudo random numbers. While these sequences may be very difficult to predict, it is sometimes possible to do so. Accordingly, it is desirable to provide a true or real random sequence. True random sequence generators have the property that the generator's sequences cannot be reproduced, even with the same input.

Schneier provides a useful discussion on Real Random-Sequence Generators at pgs. 421–428. See also *Network Working Group Request for Comments* 1750, December, 1994, the contents of which are incorporated herein by references.

In the present invention, it is preferable that the speed of the random number generator 14 be at least equal to the speed of the speed of the other components and the line speed. Embodiments of this invention can be implemented with any commercially available RNG, e.g., the RBG1210 random number generator manufactured by Tundra Semiconductor Corporation or the SG100 Security Generator manufactured by Protego Corporation.

Implementation

The basic block cipher mechanism 10 has four major modules, namely the three block ciphers 18, 20, 22, and the RNG 14. These four modules exchange 64-bit blocks in one functional cycle. Each block cipher module 18, 20, 22 has a 64-bit input and a 64-bit output. The RNG 14 has a 64-bit output. The entire block cipher mechanism 10 has a 64-bit input and a 128-bit output for each cycle.

The block cipher mechanism 10 according to this invention can be implemented on a single chip or on a number of different interconnectable chips. Some of these options are described below.

Separate Chips

In one embodiment, each module is implemented on its own chip and the XOR mechanism 24 is on its own chip or included in the BC2 20 chip. Since all of the block ciphers 18, 20, 22 operate on all 64 bits, it is not possible to begin processing until all 64 bits are available. Multiplexing a fraction of 64-bit words over a smaller number of data paths has to be done at multiples of the functional cycle speed. For example, for a 400 Mbit/sec output speed, using sixteen data leads, the cycle time on the path is 80 ns.

This separate chip approach has the advantage that it provides separate access to each of the modules and if one of the block ciphers becomes compromised it can be replaced without affecting the others. On the other hand, by having modules on separate chips, their interconnections are visible and data can be read therefrom.

Bundled Ciphers on One Chip

In another embodiment all three cipher mechanisms 18, 20, 22 are on the same chip, along with the XOR mechanism 24. There are two 64-bit inputs (one for the plaintext and the other for the output of the RNG 14) and one 128-bit output. In this embodiment, the RNG 14 is a separate chip which produces a 64-bit output.

This embodiment still allows for the output of the RNG 14 to be determined from outside. However it favors the use of a separate, commercially available random number generator.

Single Chip

The third embodiment has all components on a single chip. This has the advantages of reducing by half the number of input paths required for the chip and reducing external access to the paths between the components.

Network Integration

Preferably the cipher mixer 10 of this invention uses the TCP/IP protocol to transfer secure data. TCP/IP is a set of data communications protocols which allow for the routing of information from one machine to another, remote login capabilities and the delivery of e-mail and news. The name TCP/IP actually refers to the two major protocols Transmission Control Protocol (TCP) and Internet Protocol (IP). The TCP/IP protocol is described in detail in "Internetworking with TCP/IP," Vol. 1, 2nd Ed., Douglas E. Comer, Prentice-Hall, 1991, ISBN 0-13-468505-9. which is incorporated herein by reference. Effectively, the cipher mixer 10 acts as a TCP/IP plaintext to TCP/IP ciphertext gateway.

Figure 6A:
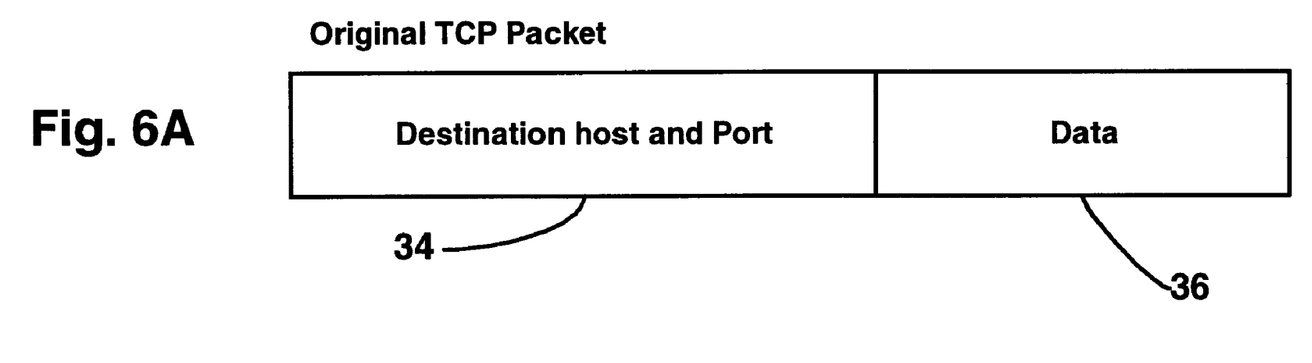
FIGS. 6A and 6B show pre- and post-processed data packets.
Figure 6B:
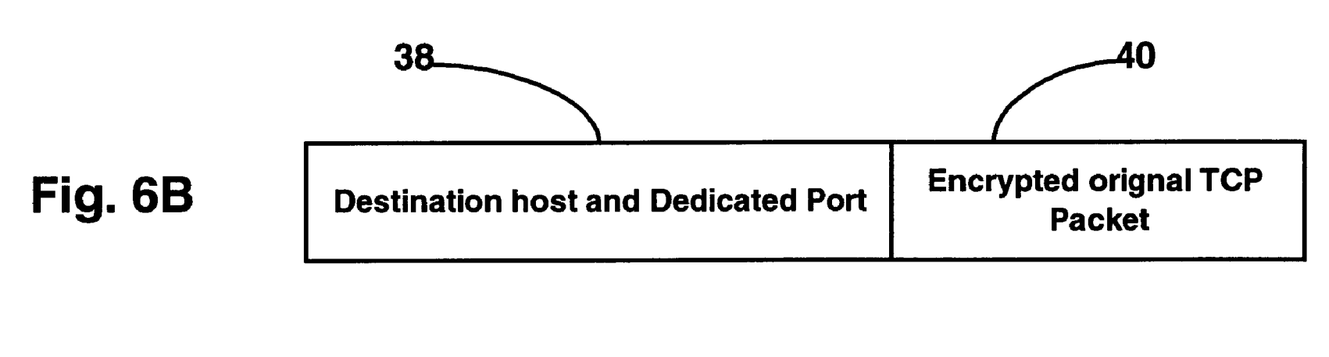

FIGS. 6A and 6B show pre- and post-processed data packets. In general, data packets coming from within a workstation can be of any IP type (TCP, UDP, any port, etc.) The destination address 34 of the original TCP packet is saved and then the whole packet (address 34 and data 36) is encrypted (using cipher mixer 10) and inserted (encrypted original packet 40) in the new TCP packet with a new address 38 including a dedicated port number. On the decryption end the process is reversed.

From the perspective of other applications and of the network, the enciphered packet (FIG. 6B) looks like any other packet since it is encased in a regular TCP/IP packet. Note that the type of the original packet is hidden in the encrypted packet.

When two network nodes communicate they need to determine whether or not they can encrypt their communications using a cipher mixer 10. There are a number of ways to do this.

Using software, network drivers used for all platforms intercept network traffic at an IP level. These drivers use cipher mixer 10 to encrypt packets and then send them via existing network interfaces (e.g., Ethernet).

In a hardware solution, the cipher mixer 10 emulates an Ethernet card. Packets are analyzed in real time, IP packets are extracted and encryption/decryption is performed on the fly. All IP traffic to peer destinations is encrypted. However, in order to preserve network semantics, TCP packets should carry encrypted TCP packets and UDP packets should carry encrypted UDP packets.

Data Compression

Since the cipher mixer 10 expands the output stream by a factor of two, it is appropriate to alleviate this problem as much as possible by compressing the plaintext prior to it being enciphered. Note, however, that data which has already been compressed or encrypted is not likely to compress much further.

EXAMPLE

Figure 7:
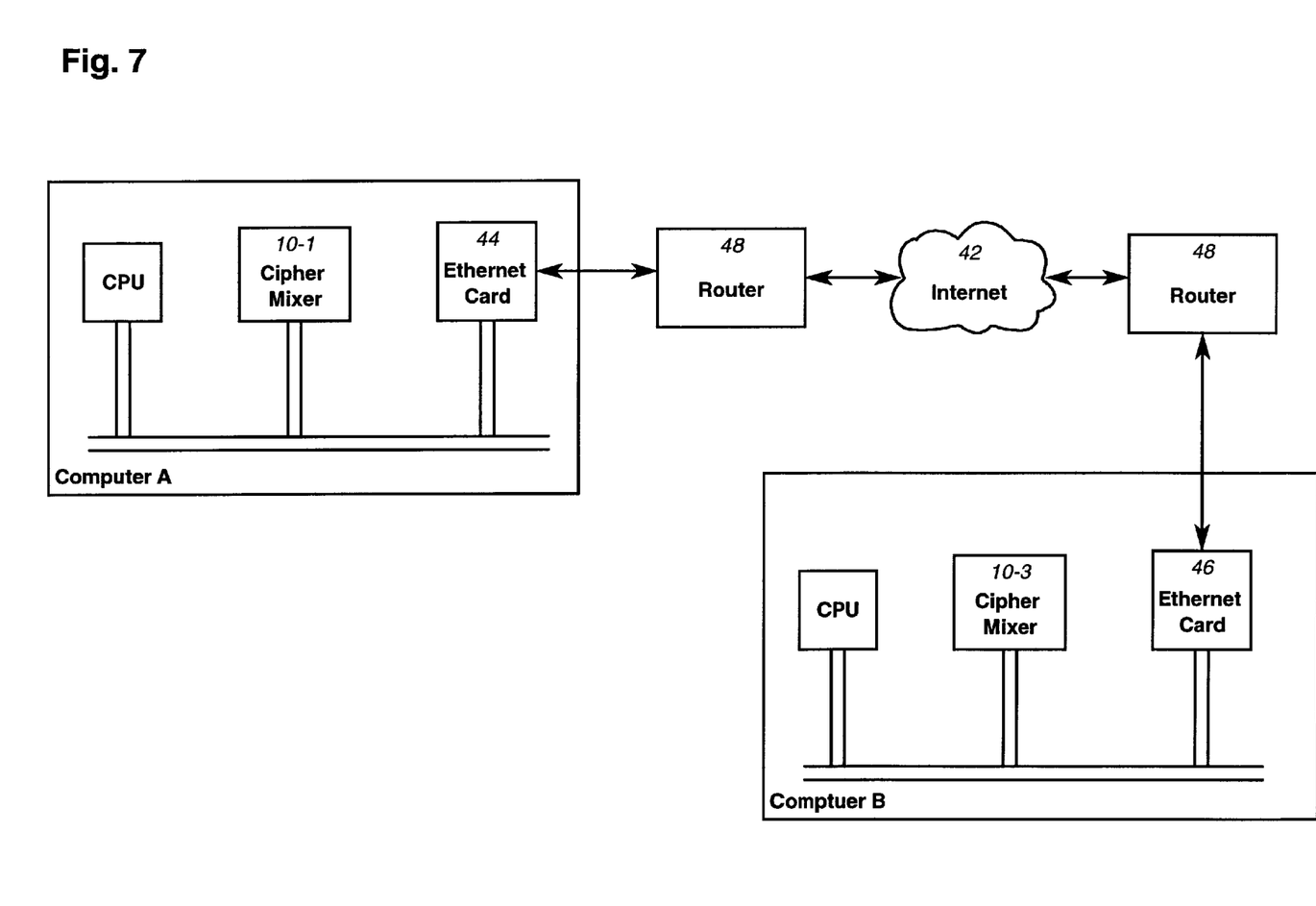
FIG. 7 shows the use of this invention in two computers connected to a network.

A system using the cipher mixer 10 according to this invention is described with reference to FIG. 7 which shows two computers A and B, each connected to a network 42 such as the Internet via an Ethernet card 44, 46. Normally the Ethernet card sends all IP packets to a router 48 which forwards packets via various intermediaries to their destination. With each computer A and B having a cipher mixer 10, all IP packets first pass through the cipher mixer 10 before/after being processed by the respective Ethernet card.

Note that the keys generated at computer A must be sent to computer B by a secure means, and vice versa. Keysets have associated replacement schedules which are set at creation time.

When an application on computer A tries to communicate with an application on computer B for the first time, the driver sends a special packet to computer B to determine if computer B is capable of encrypted communication. Part of this initial packet is a keyset name. If computer B recognizes this keyset name it responds, and from then on all traffic between computers A and B gets encrypted. If computer B cannot communicate with encrypted messages or if computer B does not recognize the keyset name, all communication remains in plaintext. If mandatory encrypted communication is required and computer B cannot comply, the application fails and no non-encrypted data is sent to computer B.

Both computers A and B can have a number of keysets that can be used to communicate with several peers.

Thus, a cipher mixer with a true random number generator is provided. One skilled in the art will appreciate that the present invention can be practiced by other than the described embodiments, which are presented for purposes of illustration and not limitation, and the present invention is limited only by the claims that follow.

What is claimed is:

1. An encryption device comprising:
   a random number generator;
   a first block cipher mechanism which takes a plaintext input and which produces a first enciphered output based on the plaintext and on a first key;
   an exclusive-or mechanism which takes as input the first enciphered output from the first block cipher and the output of the random number generator and which produces a combined output being an exclusive-or combination of the two inputs;
   a second block cipher mechanism which takes as input the output of the exclusive-or mechanism and which produces a second enciphered output based on the output of the exclusive-or mechanism and on a second key; and
   a third block cipher mechanism which takes as input the output of the random number generator and which produces a third enciphered output based on the output of the random number generator and on a third key,
   wherein the first and second block cipher mechanisms differ from each other.

2. A device as in claim I wherein the first, second and third block cipher mechanisms are selected from the group comprising: an IDEA block cipher and a Blowfish block cipher.

3. A device as in claim 2 wherein the first and third block cipher mechanisms are Blowfish block ciphers and the second block cipher is the IDEA block cipher.

4. A device as in claim 3 wherein the plaintext input is a sequence of 64-bit values and wherein the output of the random number generator is a sequence of 64-bit random values.

5. A device as in claim 3 wherein the first and second keys are 128-bit keys and wherein the third key is a 256-bit key.

6. A device as in claim I wherein the random number generator is a true random number generator.

7. An encryption device comprising:
   a true random number generator which generates a sequence of 64-bit random values;
   a first block cipher mechanism implementing a Blowfish block cipher which takes a 64-bit plaintext input and which produces a first enciphered output based on the plaintext and on a 128-bit first key;
   an exclusive-or mechanism which takes as input the first enciphered output from the first block cipher and the output of the true random number generator and which produces a combined output being an exclusive-or combination of the two inputs;
   a second block cipher mechanism implementing an IDEA block cipher which takes as input the output of the exclusive-or mechanism and which produces a second enciphered output based on the output of the exclusive-or mechanism and on a second 128-bit key; and
   a third block cipher mechanism implementing the Blowfish block cipher which takes as input the output of the random number generator and which produces a third enciphered output based on the output of the random number generator and on a 256-bit key.

8. A device for decrypting an input stream comprising encrypted data, the data including plaintext, the device comprising:
   a demultiplexer for splitting the input stream into a first and a second stream;
   a first block cipher mechanism for decrypting the first stream based on a first key to produce a third stream;
   a second block cipher mechanism for decrypting the second stream based on a second key to produce a fourth stream;
   an exclusive-or mechanism to combining the third and fourth streams into a fifth stream; and
   a third block cipher mechanism for decrypting the fifth stream based on a third key to produce the plaintext,
   wherein the first and third block cipher mechanisms differ from each other.

9. A device as in claim 8 wherein the first, second and third block cipher mechanisms are selected from the group comprising: an IDEA block cipher and a Blowfish block cipher.

10. A device as in claim 9 wherein the first block cipher mechanism the IDEA block cipher and the third block cipher is the Blowfish block cipher.

11. A device as in claim 8 wherein the first key is a 128-bit key, the second key is a 256-bit key and the third key is a 128-bit key.

12. A method of encrypting plaintext data comprising:
encrypting the plaintext data with a first block cipher mechanism to produce first encrypted data;
producing a sequence of random values;
combining the first encrypted data with the sequence of random values;
encrypting, with a second block cipher mechanism, the combined first encrypted data and the random values to produce second encrypted data;
encrypting the sequence of random values with a third block cipher mechanism to produce encrypted random values; and
combining the encrypted random values with the second encrypted data to produce the encrypted plaintext data, wherein
the first and second block cipher mechanisms differ from each other.

13. A method as in claim 12 wherein the first, second and third block cipher mechanisms are selected from the group comprising: an IDEA block cipher and a Blowfish block cipher.

14. A method as in claim 13 wherein the first and third block cipher mechanisms implement Blowfish block ciphers and the second block cipher implements the IDEA block cipher.

15. A method as in claim 14 wherein the plaintext input is a sequence of 64-bit values and wherein the output of the random number generator is a sequence of 64-bit random values.

16. A method as in claim 12 wherein each block cipher mechanism uses a different cryptographic key.

17. A method as in claim 15 wherein the first block cipher mechanism uses a first 128-bit key, the second block cipher mechanism uses a 128-bit key and the third block cipher mechanism uses a second 256-bit key.

18. A method as in claim 12 wherein the sequence of random values is a sequence of true random values.

19. A method for decrypting an input stream comprising encrypted data, the data including plaintext, the method comprising:
splitting the input stream into a first and a second stream;
decrypting, using a first block cipher mechanism, the first stream based on a first key to produce a third stream;
decrypting, using a second block cipher mechanism, the second stream based on a second key to produce a fourth stream;
combining the third and fourth streams into a fifth stream; and
decrypting, using a third block cipher mechanism, the fifth stream based on a third key to produce the plaintext,
wherein the first and third block cipher mechanisms differ from each other.

20. A method as in claim 19 wherein the first, second and third block cipher mechanisms are selected from the group comprising: an IDEA block cipher and a Blowfish block cipher.

21. A method as in claim 20 wherein the first block cipher mechanism is the IDEA block cipher and the third block cipher is the Blowfish block cipher.

22. A method as in claim 19 wherein each block cipher mechanism uses a different cryptographic key.

23. A method as in claim 22 wherein the first block cipher mechanism uses a first 128-bit key, the second block cipher mechanism uses a 256-bit key and the third block cipher mechanism uses a second 128-bit key.

24. A data processing method for communicating data between a first and a second computers, the method comprising:
(A) on the first computer:
(a) encrypting plaintext data with a first block cipher mechanism to produce first encrypted data;
(b) producing a sequence of random values;
(c) combining the first encrypted data with the sequence of random values;
(d) encrypting, with a second block cipher mechanism, the combined first encrypted data and the random values to produce second encrypted data;
(e) encrypting the sequence of random values with a third block cipher mechanism to produce encrypted random values;
(f) combining the encrypted random values with the second encrypted data to produce the encrypted plaintext data; and
(g) transmitting the combined data to the second computer,
wherein the first and second block cipher mechanisms differ from each other,
(B) on the second computer:
(a) obtaining as an input stream the transmitted combined data from the first computer;
(b) splitting the input stream into a first and a second stream;
(c) decrypting, using a fourth block cipher mechanism, the first stream to produce a third decrypted stream;
(d) decrypting, using a fifth block cipher mechanism, the second stream to produce a fourth decrypted stream;
(e) combining the third a nd fourth decrypted streams into a fifth decrypted stream; and
(f) decrypting, using a sixth block cipher mechanism, the fifth decrypted stream to produce the plaintext.

25. A method as in claim 24 wherein the first, second, third, fourth, fifth and sixth block cipher mechanisms are selected from the group comprising: an IDEA block cipher and a Blowfish block cipher.

26. A method as in claim 25 wherein the first, third, fifth and sixth block cipher mechanisms implement Blowfish block ciphers and the second and fourth block cipher mechanisms implement the IDEA block cipher.

27. A method as in claim 24 wherein the plaintext input is a sequence of 64-bit values and wherein the output of the random number generator is a sequence of 64-bit random values.

28. A method as in claim 24 wherein the first block cipher mechanism uses a first 128-bit key, the second block cipher mechanism uses a 128-bit key, the third block cipher mechanism uses a second 256-bit key, the fourth block cipher mechanism uses the second 128-bit key, the fifth block cipher mechanism uses the 256-bit key, and the sixth block cipher mechanism uses the first 128-bit key.

29. A method as in claim 24 wherein the sequence of random values is a true sequence of random values.

* * * * *